United States Patent [19]

Hafner et al.

[11] 4,049,906
[45] Sept. 20, 1977

[54] MESSAGE NETWORK FOR THE TRANSMISSION OF DIGITAL TELEGRAMS WITH AN ADDRESS CONSISTING OF ROUTING WORDS

[75] Inventors: E. Hafner, Wohlen; H. Mey, Kehrsatz, both of Switzerland

[73] Assignee: Hasler AG, Bern, Switzerland

[21] Appl. No.: 679,074

[22] Filed: Apr. 21, 1976

[30] Foreign Application Priority Data

Apr. 25, 1975  Switzerland ............... 5346/75

[51] Int. Cl.² .............. H04L 11/12; H04Q 3/56
[52] U.S. Cl. .................... 178/2 C; 178/3; 179/18 EA
[58] Field of Search .......... 178/2 R, 2 B, 2 C, 2 D, 178/2 E, 3, 50; 179/18 EA; 340/147 R, 147 T

[56] References Cited

U.S. PATENT DOCUMENTS

| | | |
|---|---|---|
| 3,560,663 | 2/1971 | Lee et al. ............... 179/18 EA |
| 3,564,499 | 2/1971 | Ryan ...................... 178/3 |
| 3,705,523 | 12/1972 | Alouisa .................. 179/18 EA |
| 3,814,839 | 6/1974 | Lubarsky, Jr. et al. .... 178/2 C |
| 3,814,840 | 6/1974 | Lubarsky, Jr. et al. .... 178/2 C |
| 3,944,723 | 3/1976 | Fong ...................... 178/3 |

*Primary Examiner*—Thomas A. Robinson
*Attorney, Agent, or Firm*—Brady, O'Boyle & Gates

[57] ABSTRACT

A general digital message network for short address-coded telegrams having plural switching stations. In each switching station the outputs of the input stores are each connected to one of the inputs of a multiplexer. The inputs of the output stores are connected to the output of the multiplexer and the output stores are each connected to a comparator circuit with a fixed value store in which the routing word associated with the outgoing line of the output store is stored, in such a way that upon correspondence of the routing word in one of the fixed value stores with the routing word at a specific location of the address of the telegram in the associated output store, this telegram is transmittable onto the output line thereof.

8 Claims, 5 Drawing Figures

MESSAGE NETWORK FOR THE TRANSMISSION OF DIGITAL TELEGRAMS WITH AN ADDRESS CONSISTING OF ROUTING WORDS

BACKGROUND OF THE INVENTION

1. Field of the Invention

The invention relates to a message network for the transmission of digital telegrams with an address consisting of the logical stringing together of routing words, with switching stations, in which in each switching station each incoming line is connected to an input store, for each outgoing line an output store is provided and a routing word associated with it is stored.

Digital message transmission and processing is nowadays widely spread. Thus, there are for example telex networks, digitally-working telex exchanges and message switching equipment for the telex traffic. Moreover, there are digitally-working data transmission networks on telephone lines, which are preferably rented point-to-point lines.

2. Description of the Prior Art

Through German Offenlegungsschrift No. 2,441,099 a combined telephone and telegraph network has become known which is a stage switching system with switching stations connected via digital channels. The messages run, in the form of address-coded message blocks, successively through the switching stages, in which in each stage the selection word which is appropriate for the respective stage and which forms a part of the address is read. The selection word then indicates the outgoing line via which the message block is to leave the switching stage.

The head of the message blocks possesses, inter alia, for the addresses as many selection words as there are switching stages which are to be run through. Thus a selection word having a constant length is associated with each switching stage that is to be run through. Furthermore, the head has one or two control words which act as counters and indicate to the respective address reading device the selection word which has to be read.

The length of the message block heads thus fluctuates according to the number of switching stages which the respective message block has to run through, but remains constant for the entire life of the block.

The head of the message blocks is thus relatively rigid and is predominantly suitable when a lot of information is to be transmitted at the same time. For short message blocks, the head would be too long and the ratio of useful information to head length would become very unfavorable.

Upon applications for telephony, each 8-bit information word incorporates a PCM scanning value, so that with at the most 256 8-bit control and information words for a single message block a considerable number of scanning values is simultaneously transmitted. This causes, in the end apparatus, a considerable expenditure for the preparation or the processing of the message packets, which respectively have to be stored as a whole. Through the input, output and intermediate stores in the switching stages, the expenditure for the stores which are necessary in the telephony and telegraphy network formed is multiplied.

German Offenlegungsschrift No. 2,441,099 thus described substantially a storage switching network for telegraphy and telexing which, through particularly rapid switching stages and special priority signals in the message block heads can also be used for telephony applications.

SUMMARY OF THE INVENTION

The problem of the invention lies in providing a general digital message network for short address-coded telegrams which works without switched-through lines, in which at any time by each subscriber irrespective of the loading state of the lines at least one short telegram can be sent off and which allows duplex connections. The circuit, control and store expenditure for routing the address-coded telegrams is to be kept as small as possible.

The problem is solved in that in each switching station the outputs of the input stores are each connected to one of the inputs of a multiplexer, the inputs of the output stores are connected to the output of the multiplexer and the output stores are each connected to a comparator circuit with a fixed value store in which the routing word associated with the outgoing line of the output store is stored, in such a way that upon correspondence of the routing word in one of the fixed value stores with the routing word at a specific location of the address of the telegram in the associated output store, this telegram is transmittable onto the output line thereof.

In this respect, a multiplexer is to be understood as being a switching device having several inputs and one output which device connects at one time only one input to the output.

The message network works advantageously with numerous short time-multiplexed telegrams.

The destination of a telegram is not readable directly from the routing address, but emerges from the logical stringing-together of the routing words which are associated with the lines that are to be run through by the telegram. The circuit and control expenditure in the exchanges is restricted to simple comparator circuits which compare respectively only that routing word which is intended for the relevant switching station with the routing word, which is stored in the fixed value store. Preferably the telegram, upon correspondence of the routing word in the fixed value store with the compared routing word of the routing address, is transmitted without this routing word to the outgoing line.

The store requirement is very small and is restricted to small buffer stores for a few telegrams.

Besides the simplicity of the circuits, the described message network has the following advantages: There are no switched-through connections. Therefore the lines are only loaded when telegrams are sent. Conversation pauses do not load the lines. On their path through the network the telegrams are directed by short instructions to the switching stations. The switching stations therefore need no devices for storing existing connections, destination addresses, etc. Furthermore, the organization of the message flow is simple. The routing words have to be unequivocal and differentiable only for respectively one switching station. Otherwise their construction is freely selectable.

The invention is described hereinunder with reference to exemplified embodiments disclosed in the drawings.

DESCRIPTION OF THE PREFERRED EMBODIMENTS

Figure 1:
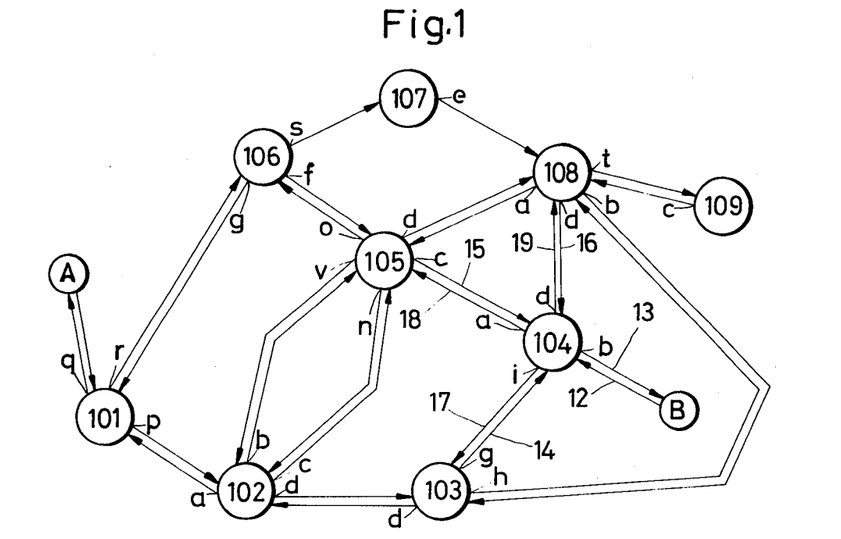
FIG. 1 shows a symbolic representation of a message network.

Referring to the drawings in greater detail, FIG. 1 shows symbolically a digital message network with nine switching stations 101 to 109 having equal rights. Between the switching stations there exist transmission lines which are represented by lines and are designated partially by the numbers 12, 13, 14, 15, 16, 17, 18 and 19. Each switching station is connected to at least one other switching station. Most of the lines are doubled in design, separately for the path to and fro, the direction being indicated by arrows.

The switching station 107 is connected to the two switching stations 106 and 108 via respectively only a single line. Between the switching stations 102 and 105 there exist two double-lines and the switching station 109 is connected only to the switching station 108. A part or all of the switching stations have a plurality of local subscribers, of which however only the two subscribers A and B are shown in the case of the switching stations 101 and 104.

Associated with each outgoing line which leaves a switching station there is a routing word in the form of a digital bit sequence. This bit sequence can be selected in accordance with any desired code and have different lengths. Here the routing words are symbolized by the small letters $a$, $b$, $c$ and so forth.

Associated with the various outgoing lines of a switching station are different routing words, so that they are characterized unequivocally and distinguishably within this switching station. Thus the routing words of the switching station 105 bear the designations $o$, $d$, $c$, $n$ and $v$, distributed arbitrarily. The routing words of the other switching stations are the same as or different from the routing words of the switching station 105. In each case, however, the distinguishability within each switching station is afforded, i.e. each letter occurs at a switching station at the most once.

The message flow via the described lines is effected by the serial transmission of a plurality of short telegrams. Each telegram is address-coded, in which connection each address is formed from the stringing-together of those routing words which are associated, in the correct sequence, with the lines that are to be run through by the telegram.

If a telephone connection exists between the subscribers A and B, then alternately both A and B send out telegrams. These telegrams have to run through at least four switching stations, but can also cover a longer route insofar as the routing address so requires. The possible routes from A to B are:

A → 101 → 102 → 103 → 104 → B
A → 101 → 102 → 105 → 104 → B
A → 101 → 106 → 105 → 104 → B
A → 101 → 102 → 103 → 108 → 104 → B and so forth.
The pertinent addresses read:

$p/d/g/b$
$p/b/c/b$
$p/c/c/b$
$r/f/c/b$
$p/d/h/d/b$
and so forth.

Since the paths of travel of the telegrams are basically freely selectable, the path of travel of the telegrams from A to B does not have to correspond with that from B to A. As a special case, however, basically for both directions the same path can be taken. If then additionally respectively identical routing words are associated with the two lines of all the connecting line pairs in the bounding switching stations (Example: connection line between the switching stations 104 and 108, routing word respectively $d$), then the telegram addresses for the two directions of each connection differ only through the sequence of the routing words.

Each switching station has comparator circuits which are described in more detail later on and which conduct the telegrams in accordance with their address onto the intended outgoing line. So that the comparator circuits can be constructed as simply as possible and each switching station can immediately recognize in a simple manner the routing word intended for it or determining one of its outgoing lines, this routing word lies for each switching station either at the beginning or at the end of the overall address, in which connection it is assumed hereinunder that the said routing word is the first routing word of the address. This means that the address of each telegram has to be varied upon the run-through of each switching station in such a way that the next switching station, or the comparator circuits thereof, finds at the correct place the routing word intended for it. One possibility for this address variation in each switching station is the cyclic transposition of the routing words of the overall address. Another simpler way consists in withdrawing the routing word intended for the processing switching station and read by this switching station from the overall address, and eliminating it. In this way, the telegram address is shortened by respectively one routing word from run-through switching station to run-through switching station.

Figure 2:
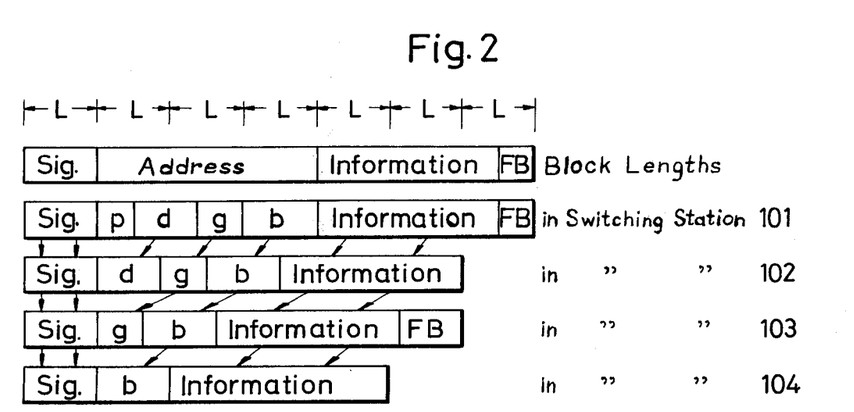
FIG. 2 shows the construction of the telegrams used.

FIG. 2 represents this procedure. Contemplated as an example is a telegram which the subscriber A sends on the path via the switching stations 101, 102, 103, 104 to the subscriber B. The telegram length amounts to a multiple of the block length L, which itself consists of 8 bits.

The telegram length is variable and varies along the path of travel through the message network. The telegram has three regions: the signalization region "Sig.", the address region "Address" and the information region "Information". The signalization region embraces 8 bits or a block length L. Arranged subsequently to this region is the address $p/d/g/b$ which consists of the routing words of the lines to be run through, in the correct sequence. The length of the various routing words, measured according to the number of bits needed, is different. In FIG. 2 it is assumed that the routing words have the following lengths:

Routing word $p$ : 4 bits
Routing word $d$ : 7 bits
Routing word $g$ : 5 bits
Routing word $b$ : 8 bits The address region thus fills three block lengths L in the example of FIG. 2. The information region comprises a further 2½ block lengths L. So that the telegram reaches a length of 7 L, additionally 4 filling bits FB are appended, which do not have any information content.

Upon the run-through of the message network on the path described, in each switching station the address of the telegram is shortened in steps, in that respectively the foremost read routing word is eliminated. The remaining address and the information region are then respectively shifted in such a way that again the foremost routing word links to the signalling region. The rear positions becoming free are then filled with filling bits. In FIG. 2 this procedure is represented schematically by arrows. After this, the address and the information region is shifted routing-word-wise to the left, while the signalling region remains place-constant in the overall telegram. The address is shortened in the following manner:

Address upon arrival in the switching station:
101 : *p/d/g/b*
102 : *d/g/b*
103 : *g/b*
104 : *b*

If the last block L contains only filling bits FB, then it is detached and eliminated.

Figure 3:
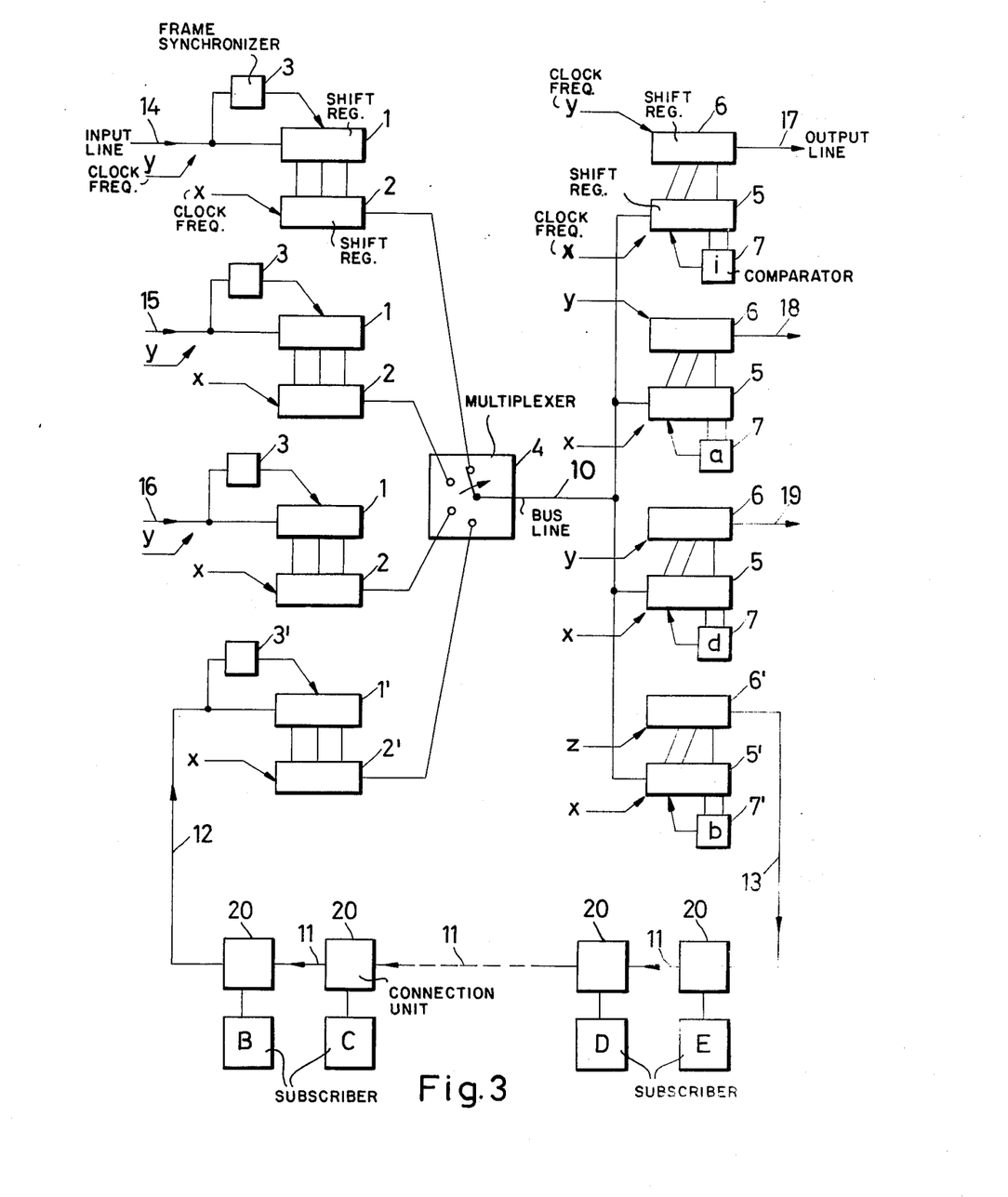
FIG. 3 shows a block wiring diagram of a switching station.

The switching station 104 is shown schematically in FIG. 3. The switching station 104 is connected via three pairs of connection lines to the neighboring switching stations 103, 105 and 108. The incoming lines bear the designations 14, 15 and 16, the outgoing lines bear the designations 17, 18 and 19.

The switching station 104 has input shift registers 1 and 2, a time multiplexer unit 4 and output shift registers 5 and 6. Frame synchronizers 3 determine for each input line 14, 15, 16 the frame repetition rate, and provide this as an output identified by an arrow, and control with this the respectively pertinent shift registers 1. Connected to each of the output store registers 5 is a comparator circuit 7 with a fixed value store in which the routing word *i, a, d* associated with the respective output line 17, 18, 19 is stored.

Via the input lines 14, 15 and 16 there arrive, independently of one another, at non-uniform intervals, telegrams from the neighboring switching stations 103, 105 and 108. The telegrams run with the transmission clock frequency *y* bit by bit into the shift registers 1. The frame synchronizers 3 detect and regenerate for each input the frame repetition rate of the telegrams and ascertain when a telegram stands with its beginning at the end of a shift register 1. As soon as this is the case, the entire telegram is transferred parallel into the pertinent register 2, whereby the said register 1 becomes free for a fresh telegram.

The time multiplexer unit 4 is an electronic unit, shown symbolically as a rotating switch, with several inputs connected to the registers 2 and an output connected to a bus line 10, which unit 4 connects the registers 2, in cyclic sequence, to the bus line 10. If a shift register 2 contains a telegram, then this is pushed with the clock frequency *x* onto the line 10, as soon as the interrogation comes to this shift register. The clock frequency *x* represented by an arrow is faster than the clock frequency *y* and the interrogation of the shift registers 2 is effected so rapidly that no congestion can occur in the registers 1 and 2.

On the bus line 10 the various telegrams run time-multiplexed and in series. Each telegram reaches at the same time the inputs of all the output shift registers 5 and runs bit by bit into these registers.

All comparator circuits 7 connected to the registers 5 compare the first routing word of the address of the telegram with the routing word stored in their fixed value stores. Since each output is associated with one of the routing words *i, a, d* which are different from each other only in the case of one output, a correspondence between the routing word stored in the fixed value store and the first routing word of the telegram can be ascertained. In the case of all the other outputs, on the other hand, no correspondence exists.

If no correspondence exists, then the examined telegram is overwritten by the next telegram and in this way cancelled. At the output, however, at which correspondence between the routing word of the telegram and that of the fixed value store has been ascertained, the entire telegram with the exception of the detected routing word is transferred in parallel into the associated output shift register 6. This procedure is indicated in FIG. 3 by three strokes between the registers 5 and 6 and has already been explained in connection with FIG. 2.

The shift register 6 has a certain storage capacity. This is necessary in order to be able to store the telegrams intermediately for a short time. Through the intermediate storage, the compensation between the faster repetition rate *x* and the slower transmission rate *y* is produced. The size of the storage capacity depends on the loading of the line and can be determined with the methods of the traffic theory.

The hitherto described part of the switching station allows in a simple way the routing of the telegrams, coming from the outside, onto one of the output lines 17, 18 or 19. In what follows the local network associated with the switching station 104 is described.

Of the local subscribers of the switching station 104, in FIG. 3, only the subscribers B, C, D and E are shown. They are connected respectively via a subscriber connection unit 20 to the common line 11. The connection of the local network to the switching station or to the overall network is effected via the lines 12 and 13 and the units 1', 2', and 5', 6', 7', which are all identical with the already discussed corresponding structural units 1, 2, 5, 6 and 7 and are also operated in an identical manner.

The connection units 20 are discussed in detail in Swiss Patent No. 550,521. They fulfill the following functions: They all receive telegrams running on the line 11; they study each telegram as to whether it is intended for the relevant subscriber; they take the telegrams intended for this subscriber out of the traffic flow; they retransmit all the other telegrams; they provide temporal space for the sending of telegrams of their own; they have stored the address of the respective connection and provide each telegram of their own with this address.

The lines 11, 12, 10 and 13 form, together with the structural units lying therebetween, a ring system on which the telegrams run in the clockwise direction. The entire local traffic is run on these lines.

If two local subscribers, e.g. the subscribers B and D, telephone one another, then the telegrams run through the said lines in the clockwise direction until they reach the connection unit 20 of the partner. Thus the telegrams of subscriber D reach in this way the partner B on a short path via the line 11 and the subscriber connection unit of subscriber C. The telegrams from subscriber B, on the other hand, run through successively the lines 12, 10, 13 and 11, as well as the units connected therebetween, before they reach the subscriber connection unit 20 of subscriber D and are withdrawn from the traffic flow.

On the latter described path the telegrams run through the units 1' and 2'. They are interrogated from here in an identical manner to the previously described telegrams by the multiplexer unit 4 and conducted onto the bus line 10. Via the address comparison in the structural units 5' and 7' the telegrams reach the shift register 6' and thus in turn the local network.

The multiplexer unit 4 thus combines on the bus line 10 all of the telegrams arriving via the units 1 and 1', irrespective of their addresses. Likewise all the units 5 and 7 as well as 5' and 7' study all of the telegrams. In this way in a uniform manner all of the direction possibilities can be handled. The direction possibilities are: transfer telegrams from a neighboring switching station to another neighboring switching station; local telegrams from a local subscriber to another local subscriber; departing telegrams from local subscribers to neighboring switching stations; incoming telegrams from neighboring switching stations to local subscribers.

The enlargement or widening of the message network is possible through simple measures:

New subscribers are connected via respectively an additional subscriber connection unit 20 to the line 11.

An additional local network can be provided in that via additional units 1', 2', 3', 5', 6' and 7' a further ring system with its own routing word is connected to the bus line 10.

Additional transmission lines are connected, by the addition of new units 1, 2, 3, 5, 6 and 7 and allocating of a routing word, to an existing switching station.

Upon overloading of the time multiplexer unit 4 there exists the possibility of expansion of the system by connecting part of the transmission lines and/or of the local ring systems, combined anew, with an additional time multiplexer unit 4. In this way there arises a new switching station which is spatially closely adjacent with the original switching station and can be connected thereto via one or more "transmission lines".

Completely new switching stations are inserted into the message network, in that the necessary transmission lines are connected and the necessary routing words are allocated.

Figure 4:
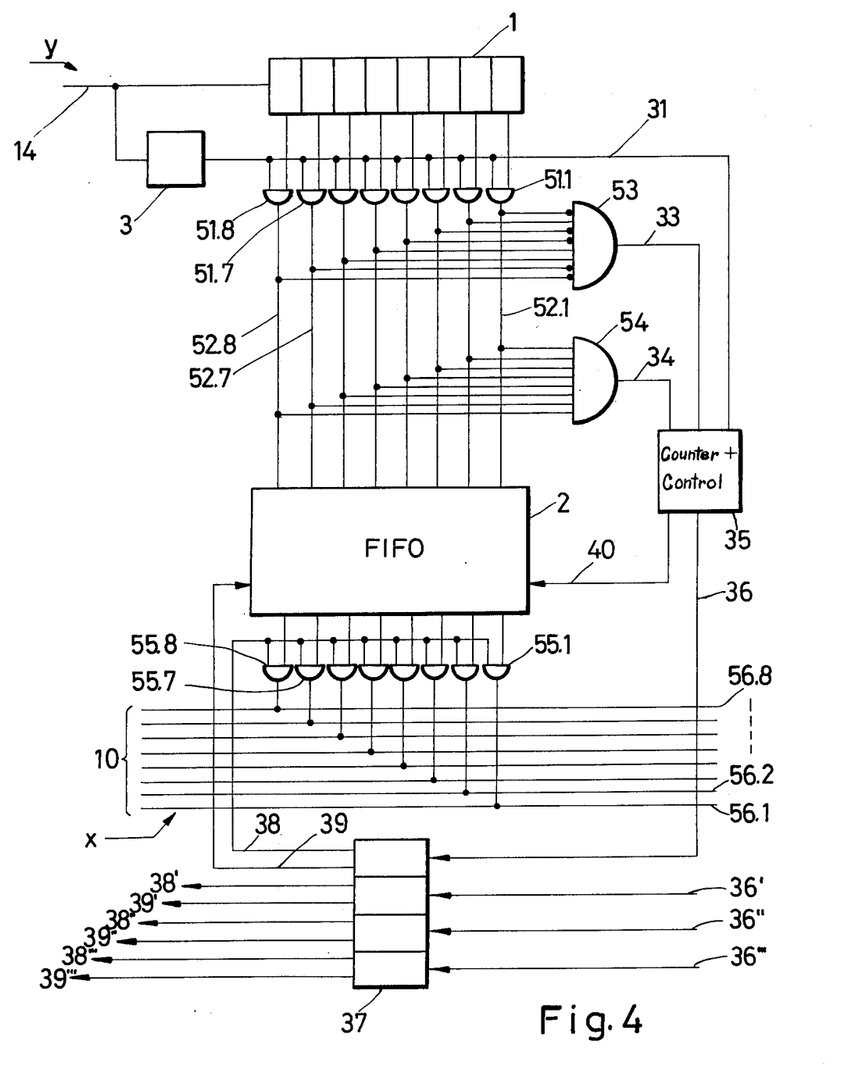
FIG. 4 shows a detail diagram of an input circuit and of the multiplexer of a modified form of the switching station in accordance with FIG. 3.
Figure 5:
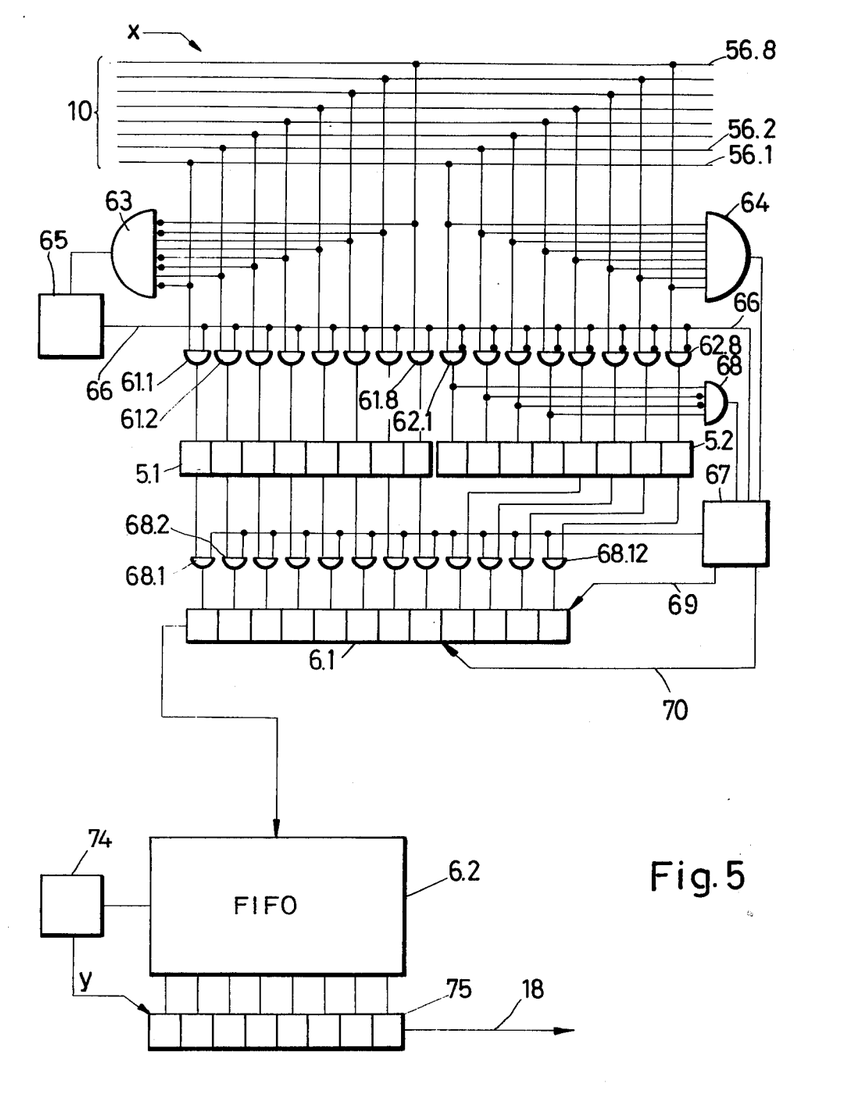
FIG. 5 shows a detailed diagram of an output circuit of the switching station in accordance with FIG. 4.

FIGS. 4 and 5 represent in detail a preferred modified form of the switching station 104 shown schematically in FIG. 3. FIG. 4 shows, in this respect, the input circuit of the input lines 14 and the multiplexer of the switching station. FIG. 5 shows the output circuit of the output line 18.

Via the incoming line 14, which is designed as a conventional PCM line, bits reach an input shift register 1 uninterruptedly in the repetition rate $y$. A frame synchronizer 3 arranges the bits into blocks L of eight bits each, as is known from the PCM technique. In this way successively respectively eight bits forming a block pass into the shift register 1. Via eight AND-gates 51.1 to 51.8 the content of the shift register 1 is read out parallel onto lines 52.1 to 52.8 after each eight bits, for which purpose a control pulse is emitted via the control line 31 from the frame synchronizer 3. In accordance with the content of the shift register 1 the signals logical 1 or 0 thus are applied to the lines 52.1 to 52.8.

The blocks L are stored indiscriminately successively into a register 2, which is designed as an eight-bits-parallel first-in-first-out storage register (FIFO), the capacity of which comprises two complete telegrams of maximum length. At the same time the significance of all the blocks L is checked. For this two gates 53 and 54 simulate the bit combination "signalization" or "only filling bits". They thus emit at the beginning of a telegram (gate 53) or after run-through of a telegram (gate 54) via lines 33 or 34 respectively a signal to a counting and control unit 35. This unit 35 receives further via the control lines 31 the frame synchronization rate, so that by simple logical combinations the beginning, the length and the end of telegrams can be ascertained.

If a telegram is contained completely in the first-in-first-out register 2, then the counting and control unit 35 gives via a line 36 a corresponding notification to a control 37. This control 37 forms a part of a time multiplexer which corresponds to the time multiplexer unit 4 in FIG. 3 and receives via lines 36', 36", 36'" irregularly corresponding notifications from the other input circuits, not shown in FIG. 4, of the lines 15, 16 and 12.

The control 37 emits in cyclic sequence, however, control signals onto lines 38 and 39, 38' and 39', 38" and 39" or 38'" and 39'", respectively, only when there exists a notification on the corresponding line 36, 36', 36" and 36'".

The output of the register 2 is connected to lines 56.1 to 56.8 by AND-gates 55.1 to 55.8 connected to the line 38.

The first control signal on line 38 opens in parallel all the AND-gates 55.1 to 55.8, whereby the bits of the first telegram block L pass in bit-parallel manner from the register 2 onto the lines 56.1 to 56.8.

After the gates 55.1 to 55.8 are closed once more, a signal on the line 39, which is connected to the register 2, shifts the content of the first-in-first-out register 2 by one location further, whereupon by opening of the gates 55.1 to 55.8 the second telegram block passes onto the lines 56.1 to 56.8. This procedure is repeated until the entire telegram is read out onto the lines 56.1 to 56.8. Then the control 37 switches to the next input circuit (not shown) of the input line 12 and the control lines 38' and 39' associated with it, etc.

The lines 56.1 to 56.8 form together the bus line 10 of FIG. 3 which is operated with the repetition rate $x$ and on which, in bit-parallel and block-serial manner, successively the telegrams of all the input lines 14, 12, 16, 15 appear. As soon as a block L contains only filling bits, it is shifted by advance signals of the counting and control unit 35, which are given to a line 40 connected to the register 2, inside the first-in-first-out register 2 in such a way that it is finally nullified and does not pass onto the lines 56.1 to 56.8.

FIG. 5 shows the output circuit, associated with the output line 18, of the switching station. Connected to the bus line 10 which is formed by the eight parallel-extending lines 56.1 to 56.8, are the following units: eight AND-gates 61.1 to 61.8, eight AND-NOT-gates 62.1 to 62.8, a gate 63 which simulates the bit combination "signalization" and is identical to the gate 53 of FIG. 4 and a gate 64 which simulates the bit combination "only filling bits" and is identical to the gate 54 of FIG. 4. The gate 63 is connected to a control unit 65 which, via a line 66, controls all of the gates 61 and 62 and is further connected to a control unit 67. The control unit 67 receives further signals from a gate 68 which simulates that routing word which is associated with the output circuit shown. The gate 68 thus corresponds to the fixed value store of the comparator circuit 7 of FIG.

3 for the output line 18. The gate 68 has 4 inputs and simulates the routing word a.

The output circuit has furthermore two registers 5.1 and 5.2 for each eight bits which correspond to the output shift register 5 of FIG. 3. A shift register 6.1 for 12 bits and a first-in-first-out register 6.2 correspond analogously to the output shift register 6 of FIG. 3. A shift register 75 forming a parallel/serial converter and a control 74 for the registers 6.2 and 75 complete the arrangement.

Via the bus line 10 or the lines 56.1 to 56.8 respectively all the telegrams arrive at the gates 61, 62, 63 and 64. The gates 61.1 to 61.8 are generally open, the gates 62.1 to 62.8 blocked. In this way successively all of the blocks L are written into the register 5.1 and are overwritten again by the following block.

However, as soon as the gate 63 registers the beginning of a telegram, identified by the combination "signalization", the AND-gates 61.1 to 61.8 are blocked via the control unit 65 and the line 66 and at the same time the AND-NOT gates 62.1 to 62.8 are opened. In this way respectively the second telegram block, which in accordance with FIG. 2 contains the routing word that is to be read, is written into the register 5.2. At the same time there is effected the comparison of the first routing word of the telegram address with the simulation of this word by the gate 68. If the comparison is negative, then no reaction ensues.

On the other hand, if the address comparison is positive, in other words the routing word of the telegram address and the simulation correspond, then a signal occurs at the output of the gate 68. In this way the control unit 67 opens all the AND-gates 68.1 to 68.12 and the content of the registers 5.1 and 5.2 is transferred without the bits representing the routing word in parallel into the shift register 6.1.

The control unit 65 re-establishes irrespective of the address comparison for the third telegram block the original state of the gates 61.1 to 61.8 and 62.1 to 62.8. In this way this third block and all further blocks pass once more into the register 5.1.

With a positive address comparison the control unit 67 emits subsequent to the transfer of the register content from registers 5.1 and 5.2 to 6.1 via a line 69 a clock sequence of 12 bits, whereby the entire content of the shift register 6.1 is transferred serially into the first-in-first-out register 6.2.

In the rhythm of the telegram blocks arriving via the lines 56.1 to 56.8 there is now effected the insertion of the blocks into the shift register 6.1 and the serial transfer into the register 6.2. For this the control unit 67 opens respectively the AND-gates 68.1 to 68.12 and emits subsequently a clock sequence of 8 bits via the line 70 to the shift register 6.1.

This work cycle is interrupted as soon as either the control 65 announces via the line 66 the beginning of a new telegram or the gate 64 announces an "only filling bits" block.

The control 74 controls the reading of the telegrams out of the first-in-first-out register 6.2. For this the telegrams are transferred blockwise in parallel into the shift register 75 and subsequently pushed with the transmission rate $y$ onto the output line 18. If no telegram is contained in the register 6.2, then the control 74 ensures the sending out of "only filling bits" blocks.

The advantages of the arrangement described are more especially the following:

a. The addressing of the telegrams is simple. The address consists of the stringing-together of routing words, in which connection the type of these routing words is largely free and can be identical, similar or different from switching station to switching station.

b. The traffic flow is clearly and simply organized. In this way no collisions between different telegrams can arise. Through the time multiplexer unit 4 a telegram sequence is laid down which unequivocally clarifies "sooner or later".

c. In the switching station the transit traffic and the local traffic is largely handled identically. Therefore the transition between the two regions of this switching station is very simply possible.

d. The expansion of the switching stations and of the message network is very simple.

e. Each transmission line, the transit region and each local region of the switching stations works with a clock frequency of its own. In this way the synchronization of the overall network is abolished.

f. In the switching station only the routing words of the outgoing lines or of the transition into the local region are stored. On the other hand, no information regarding existing connections has to be stored.

g. Telegrams without information, such as arises for example upon conversation pauses, are not sent and therefore do not load the message network.

h. The number of different structural units in the switching station is low, which is very important in economical respects.

i. The control expenditure is minimal.

The embodiments, described with reference to FIG. 3 as well as to FIGS. 4 and 5, of the switching stations can for example be designed differently or be arranged differently as follows:

The connection of the registers 2 to the bus line 10 by the time multiplexer unit 4 is not effected cyclically, but the registers 2 are connected to the bus line 10 in the sequence in which they have received a telegram.

The transmission of the telegrams on the bus line 10 can be effected in bit-serial manner, in bit-parallel manner or in mixed operation.

The synchronization can be rigid in the entire message network.

At one switching station the number of incoming and outgoing connection lines can be different.

The construction of the telegrams can be different. Thus, for example, the sequence of the telegram regions "address" and "information" can be transposed or the block length L can be selected differently.

Instead of the address shift and elimination of the latterly read routing word, the routing words read can be marked, in order to identify to the next switching station the routing word associated with it.

The identification of the routing word that is to be read can further be effected by a binary number which is contained in the telegram and is respectively increased after the reading of a routing word by the number of bits of the word read.

The subscribers A, B, etc. are not connected via a local ring system to the switching station, but directly, precisely like an outgoing transmission line.

A subscriber connection unit can be associated with several subscribers and thus act as a concentrator.

The local telegram traffic does not proceed via the bus line 10, but is developed via a connection line of its own between the lines 12 and 13.

The subscriber addresses are not contained in the subscriber connection unit 20, but as a whole in a central store. In this case each telegram intended for the local region examines this store and removes from it the outing word, for example in the form of a number, which signifies the subscriber connection units that are still to be run through.

The subscriber addresses are contained in a connection unit 20 which is designed as a concentrator for several subscribers.

If several parallel lines exist between two switching stations, then identical routing words can be associated with these lines, insofar as an addition device ensures that each telegram passes respectively only onto a single one of the parallel lines and the traffic flow is distributed uniformly to all the lines.

The short-time intermediate storage of the telegrams by buffer stores for the compensation of non-uniform line loadings can be effected, instead of at the output lines, also at the input lines, in that the shift registers 2 are correspondingly expanded.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

We claim:

1. A message network for the transmission of digital telegrams, comprising a plurality of switching stations (101-109) for the routing of said telegrams from any of said stations (101) on one of a plurality of selectable routes via any successive interconnected stations (101, 102, 103, 104), to any desired station (104), each of said telegrams including an address consisting of a logical stringing together of routing words (p,d,g,b) and said route being determined by the succession of the routing words of the address (p/d/g/b), in which in each station (101-109) each input line (14,15,16) is connected to an input store (1,2), for each output line (17,18,19) an output store (5,6) is provided and a routing word (i,a,d) is assigned, the routing words (i,a,d) associated with the output lines (17,18,19) of one station (104) being different from each other, in each station (101-109) the outputs of the input stores (1,2) are each connected to one of the inputs of a multiplexer (4), the inputs of the output stores (5,6) are connected to the output (10) of the multiplexer (4) and the output stores (5,6) are each connected to a comparator circuit (7;67;68) with a fixed value store (7;68) in which the routing word (i,a,d) associated with the output line (17,18,19) of the output store (5,6) is stored, in such a way that upon correspondence of the routing word (i,a,d) in one of the fixed value stores (7; 68) with the routing word at a specific location of the address of the telegram in the associated output store (5; 5.2), this telegram is transmittable onto the output line (17,18,19) thereof.

2. A message network as set forth in claim 1, in which each output store has a first register (5; 5.1, 5.2) which is connected to the comparator circuit (7; 67, 68) with the fixed value store (7; 68) and the input of which is connected to the output (10; 56.1-56.8) of the multiplexer (4), and has a second register (6; 6.1, 6.2) the output of which is connected to an output line (17, 18, 19), and the storage elements of the first register (5; 5.1, 5.2), with the exception of those which correspond to the said location of the address of the telegram, are connected to the storage elements of the second register (6; 6.1), and in that upon correspondence of the routing word (i, a, d) in the fixed value store (7; 68) with the routing word at the said location of the address of the telegram in the first register (5; 5.2), this telegram is transferrable without this routing word from the first register (5; 5.2) into the second register (6; 6.1, 6.2) and from this latter onto the output line (17, 18, 19).

3. A message network as set forth in claim 2, in which the storage elements of the first register (5; 5.1, 5.2), with the exception of those which correspond to the first routing word of the address of the telegrams, are connected to store elements of the second register (6; 6.1), and in that upon correspondence of the routing word (i, a, d) in the fixed value store (7; 68) with the first routing word of the address of the telegram in the first register (5; 5.2) this telegram is transferrable without its first routing word from the first register (5; 5.1, 5.2) into the second register (6; 6.1) and from this latter onto the output line (17, 18, 19).

4. A message network as set forth in claim 3, in which the input store has two registers (1, 2) which are connected in parallel to one another and the one (1) of which is connected to the input line (14, 15, 16) and to a clock generator (y) for the input of the telegrams and the other (2) of which is connected to the multiplexer (4) and to another clock generator (x) for the shifting of the telegrams, and in that the clock frequency of the one clock generator (y) is equal to the transmission frequency and the clock frequency of the other clock generator (x) is higher than the transmission frequency.

5. A message network as set forth in claim 4, in which the inputs of the multiplexer (4), connected to the outputs of the input stores (1, 2), are connected periodically to the output (10) of the multiplexer (4).

6. A message network as set forth in claim 4, including a multiplexer control (35) responding to the content of the input stores (1, 2), in order to connect only those outputs of the input stores (1, 2) which contain a telegram for transmission from those stores to the output (10; 56.1-56.8) of the multiplexer (4).

7. A message network as set forth in claim 6, in which the input stores (1', 2', 1, 2) and output stores (5', 6', 5, 6) for local subscriber lines and transmission lines are constructed the same and are connected so as to enjoy the same rights to the multiplexer (4).

8. A method for operating the message network as claimed in claim 2, characterized in that the incoming telegrams, buffered in the input stores (1, 2) are called up after at the latest one telegram length duration by the multiplexer (4), in that the telegrams, in the sequence laid down by the multiplexer (4), simultaneously reach all the first registers (5) of the output stores (5, 6), in that simultaneously each comparator circuit (7, 67, 68) compares the routing word of the telegram address, associated with one of the output lines (17, 18, 19) of the switching station with the routing word (i, a, d) stored in the fixed value store (7, 68) and associated with the respective output line (17, 18, 19), and in that only upon correspondence of the two compared routing words the telegram is stored into the second register (6) of the corresponding output store (5, 6) for the following transmission via the output line (17, 18, 19) of this output store (5, 6) in such a way that the bits of the compared routing word are eliminated and the resulting gap is closed in seamless manner by the moving up of all the following telegram bits.

* * * * *